United States Patent

[11] 3,618,789

[72] Inventor Dorse James Young
Centerville, Ohio
[21] Appl. No. 1,407
[22] Filed Jan. 8, 1970
[45] Patented Nov. 9, 1971
[73] Assignee Harris-Intertype Corporation
Cleveland, Ohio

[54] MATERIAL CUTTER CONTROL APPARATUS
7 Claims, 12 Drawing Figs.

[52] U.S. Cl. .......... 214/1.6,
83/71, 83/278, 340/174.1 K
[51] Int. Cl. .......... B23q 5/50
[50] Field of Search .......... 83/278, 71;
214/1.4–1.6; 340/174.1 K

[56] References Cited
UNITED STATES PATENTS

| | | | |
|---|---|---|---|
| 3,118,334 | 1/1964 | Blaha | 83/71 |
| 3,236,131 | 2/1966 | Barley | 214/1.6 X |
| 3,245,556 | 4/1966 | Thumin | 214/1.6 |

*Primary Examiner*—Gerald M. Forlenza
*Assistant Examiner*—Frank E. Werner
*Attorney*—Marechal, Biebel, French & Bugg

ABSTRACT: A control apparatus for a material-positioning device includes a magnetic tape which moves, in response to the movement of a machine element, relative to magnetic sensing and/or recording heads. The assembly which supports the heads is indexed in a direction perpendicular to the direction of relative movement to define a plurality of tracks on the magnetic tape. A mechanism moves the head assembly a predetermined distance for each indexing movement When the head assembly reaches one extremity of the tracks, its indexing direction of movement is reversed, and the heads are repositioned to define tracks on the tape which alternate with the tracks defined by the head assembly when moving in the first direction. An adjustment cam is provided to move the head assembly in the direction of relative movement for accurate alignment of the machine element. The magnetic tape is continuous and is moved synchronously with the machine element by means of a chain driven by a lead screw. The chain is tensioned by a first spring and the tape is tensioned by a second spring having a spring constant less than the first spring.

INVENTOR

D. JAMES YOUNG

BY

Marechal, Biebel, French & Bugg

ATTORNEYS

MATERIAL CUTTER CONTROL APPARATUS

RELATED APPLICATIONS

Reference is hereby made to copending applications Ser. No. 1,506, filed Jan. 8, 1970 and Ser. No. 1,406, filed Jan. 8, 1970, assigned to the same assignee as the present invention.

BACKGROUND OF THE INVENTION

In material-cutting devices, such as shown in U.S. Pat. Nos. 3,118,334 and 3,176,556, a back gauge is driven by a lead screw to position a stack of material beneath a knife. The position of the back gauge may be controlled either manually or automatically by a magnetic record, i.e., tape or drum, moving relative to magnetic sensing heads in response to the movement of the back gauge. In the material-cutting device of the type disclosed in the above-mentioned patents, the control record may contain a plurality of channels with each channel containing control marks for a particular job program.

In the most commonly used paper cutters, a drum control record is used, such as shown in FIG. 12 of U.S. Pat. No. 3,118,334, with the drum being rotated to select various job programs. The drum is coated with a magnetic material, and magnetic marks are recorded on the drum and sensed by heads which move with the back gauge. Thus, as the back gauge is moved forward and a stop mark is sensed, the back gauge will stop at a predetermined location and cutting of the material may then take place.

SUMMARY OF THE INVENTION

This invention relates to a novel mechanism for controlling the position of a machine element, such as a back gauge of a material-cutting device, and includes a magnetic tape which moves relative to a plurality of sensing and/or recording heads at the same time the machine element is being moved.

The magnetic control tape used in this invention is placed in a protected location, typically below the table and accessible to the machine operator, and is moved relative to the sensing and/or recording heads by the lead screw which also moves the back gauge across the table. In the preferred embodiment, the tape moves at the same linear speed as the back gauge.

The sensing and/or recording heads are supported adjacent the tape and may be moved in a direction substantially perpendicular to the direction of movement of the tape to a plurality of positions corresponding to tracks on the tape. The heads are moved a predetermined distance for each indexing movement, and when the direction of movement of the heads is reversed, the heads are initially moved one-half the predetermined distance therefore defining tracks on the tape which alternate with the tracks so defined when the heads are moving in the opposite direction.

The sensing and/or recording heads may also be adjusted in the direction of relative movement between the tape and the heads in order to ensure that the material is properly aligned relative to the knife for cutting. In paper-cutting devices, for example, when printed stock is being cut, the position of the printing may vary slightly from one job to another. The adjustment of the heads therefore allows the back gauge to position a stack of paper accurately relative to the printing while retaining thereafter the relative spacing between control marks on the tape. This manual adjustment is also useful when replacing a control tape which has job marks already placed or recorded thereon.

By using a control tape in a protected environment, the control tape may be expected to endure for a longer time period, be less subject to damage from accident, and if replaced, be less expensive than a control drum.

Accordingly, it is an object of this invention to provide an improved control mechanism for positioning a machine element, the control mechanism including a magnetic tape which is moved relative to sensing and/or recording heads with the recording heads being positionable to a plurality of control tracks across the tape, the control tracks being defined by indexing the control heads in a single direction through a predetermined distance and alternating the tracks by moving the heads through one-half the predetermined distance initially when the direction of movement is reversed; to provide a control mechanism wherein the control tape may be easily removed and replaced and which is less expensive than prior art control records; and to provide a control device for positioning a machine element to a plurality of infinitely variable locations of the type described above wherein the control record is a magnetic tape which is moved through the same distance as the machine element in response to the same drive mechanism which moves the machine element.

Other objects and advantages of the invention will be apparent from the following description, the accompanying drawings and the appended claims.

DESCRIPTION OF THE PREFERRED EMBODIMENTS

Figures 1, 2:
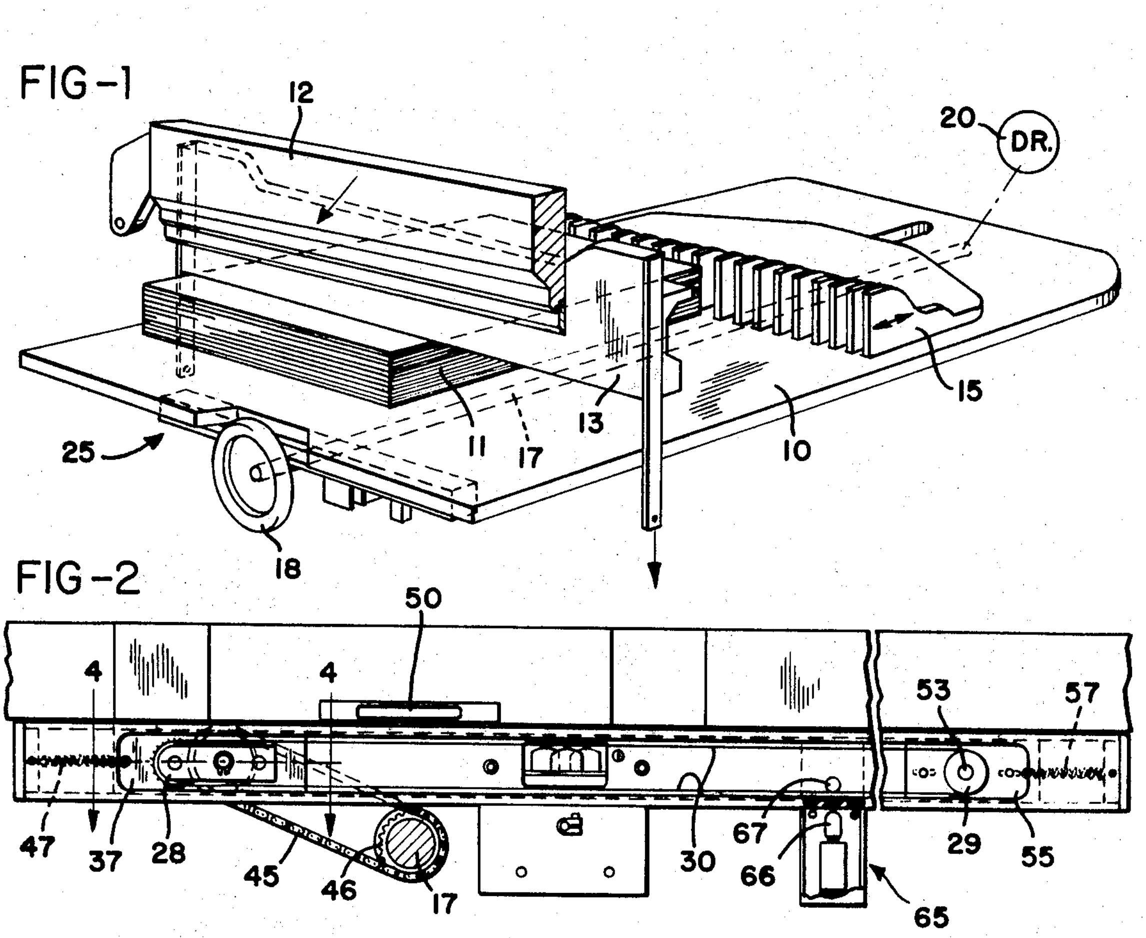
FIG. 1 is a perspective view of a material cutting device which includes the control mechanism of this invention.
FIG. 2 is a front elevational view showing a control tape and the sensing and/or recording heads.

Referring now to the drawings, the material-cutting apparatus is shown generally in FIG. 1 and includes a table 10 upon which a stack of material 11, such as paper, may be placed to be cut by a knife 12. A clamp 13 holds the material during cutting while a back gauge 15 positions the material beneath the knife. The back gauge is moved by a lead screw 17 rotatably supported beneath the table. A hand wheel 18 is attached to one end of the lead screw and permits the machine operator to position to back gauge manually. A dual-speed drive means 20 is attached to the other end of the lead screw 17, and positions the back gauge 15 automatically under the direction of a position control means, shown generally at 25.

In operation, the material 11 is placed on the table 10, and the back gauge 15 positions the material under the control of the position control means 25. The back gauge 15 moves forwardly at a relatively high rate of speed until the material approaches the desired cutting position at which time the position control means 25 will first slow the back gauge, and then stop it at the desired position. By slowing the back gauge immediately prior to sensing the control mark on the control record in the position control means 25, the inertial effects of the backgauge 15 and the material 11 are materially reduced. After the back gauge has stopped, the clamp 13 engages the material to hold it securely, and the knife 12 then cuts the material. Thereafter, the back gauge 15 again moves forward and repositions the material 11 to another position, all under the control of the position control means 25.

Figure 3:
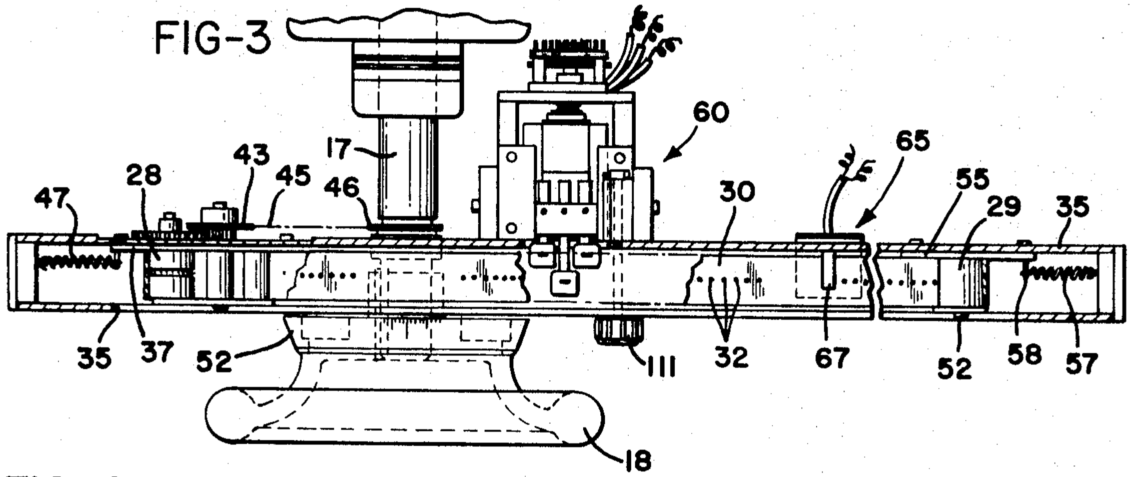
FIG. 3 is a plan view of the control mechanism constructed according to this invention.
Figure 4:
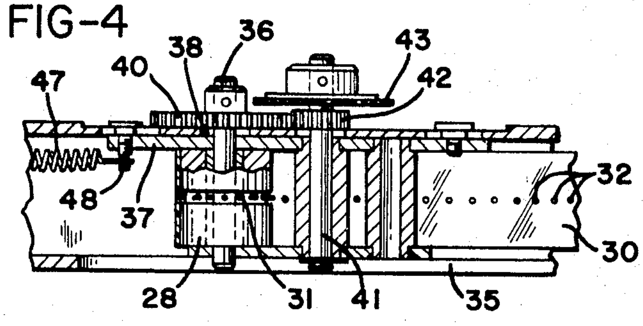
FIG. 4 is an enlarged cross-sectional view taken along the line 4—4 in FIG. 2.

The position control means 25, as shown in FIGS. 2 and 3, includes a sprocket wheel 28 and a roller 29 over which is reeved a magnetic tape 30 formed into a continuous belt. Sprocket wheel 28 has formed thereon a plurality of pins 31 which engage sprocket holes 32 positioned centrally of the tape 30 to provide positive and accurate control over the movement and position of the tape. The position control means is contained within a protective housing 35 which protects the tape 30 and other components from dust and/or accidental damage.

The sprocket wheel 28 rotates about a shaft 36 which is journaled in a carriage 37 slidably mounted within the housing 35. An opening 38 in the housing accommodates an extension of the shaft 36, and on the exterior of the housing is mounted a gear 40 which rotates a sprocket wheel 28. Also journaled in the carriage 37 is a shaft 41 on which is carried a gear 42 which meshes with the gear 38. The shaft 41 also carries a sprocket 43.

A chain 45 mechanically connects the sprocket 43 with a sprocket 46 which is mounted to rotate with the lead screw 17. Tension is maintained on the chain 45 by a spring 47 secured at one end to the housing 35 and at its other end to a pin 48 attached to the carriage 37.

The gear ratio between the sprockets 43 and 46, and the gears 40 and 42 are so selected that the tape 30 moves through the same distance as the back gauge 15. In the preferred embodiment, the tape 30 carries on it visible indicia, and since it moves through the same distance as the back gauge 15, the operator may refer to the visible indicia when positioning the back gauge manually. By viewing the tape through an opening 50 in the housing which is located adjacent a circular scale 52 mounted to rotate with the lead screw 17 and the hand wheel 18.

The roller 29 is rotatably mounted on a shaft 53 which is supported in a carriage 55. The magnetic tape 30 is held in tension against the roller 29 and the sprocket wheel 28 by spring 57, one end of which is connected to a pin 58 attached to the carriage 55. The spring 47 is stronger (i.e., has a larger spring constant) than the spring 57 so that the chain 45 will be held in tension while the tape 30 is, at the same time, tensioned against the sprocket wheel 28 and the roller 29.

The position control means 25 also includes a sensing head assembly 60 which records and senses magnetic marks on the magnetic tape 30 to control the operation of the back gauge 15. In the preferred embodiment, three magnetic recording and/or playback heads are employed, two of which are aligned with the direction of relative movement between the tape and the heads so that they scan the same marks on the tape. These two aligned heads scan tracks located on one half of the tape, or from one edge of the tape to the sprocket holes 32. The third recording and/or playback head is mounted so that it scans tracks on the other half of the tape. All three heads are mounted on an assembly, the details of which will be described, and move simultaneously across the tape in a direction substantially perpendicular to the direction of relative movement between the tape and the sensing heads, the position of the heads therefore defining a plurality of channels or tracks on the tape in which different job programs may be recorded.

In the preferred embodiment, a two-speed drive motor 20 is used and the back gauge is moved at the higher speed until a control mark is sensed by the first or deceleration head 61. At this time, the drive means 20 is shifted to the lower speed to move the back gauge, and thus the material 11, at a slower speed until the same control mark is sensed by the stop head 62. Since the back gauge 15 and the material 11 are moving at the slower speed when the stop mark is sensed, the inertial effects are minimized. The third sensing head 63 is used to sense a reversing mark which causes the drive motor 20 to reverse its direction of movement, thus repositioning the back gauge 15 automatically in preparation of subsequent cutting of a same or different stack of material 11, depending on the job programs selected.

A tape position indicating means 65, which in the preferred embodiment includes a lamp 66 and a photoelectric transducer 67 (FIG. 2) senses the passage of sprocket holes 32 and is used to ensure that the back gauge 15 is driven at the slower speed in the event that a second control mark is located between the deceleration and stop heads. A more complete description of this feature is found in copending U.S. Pat. application Ser. No. 1,406.

Figures 11, 12:
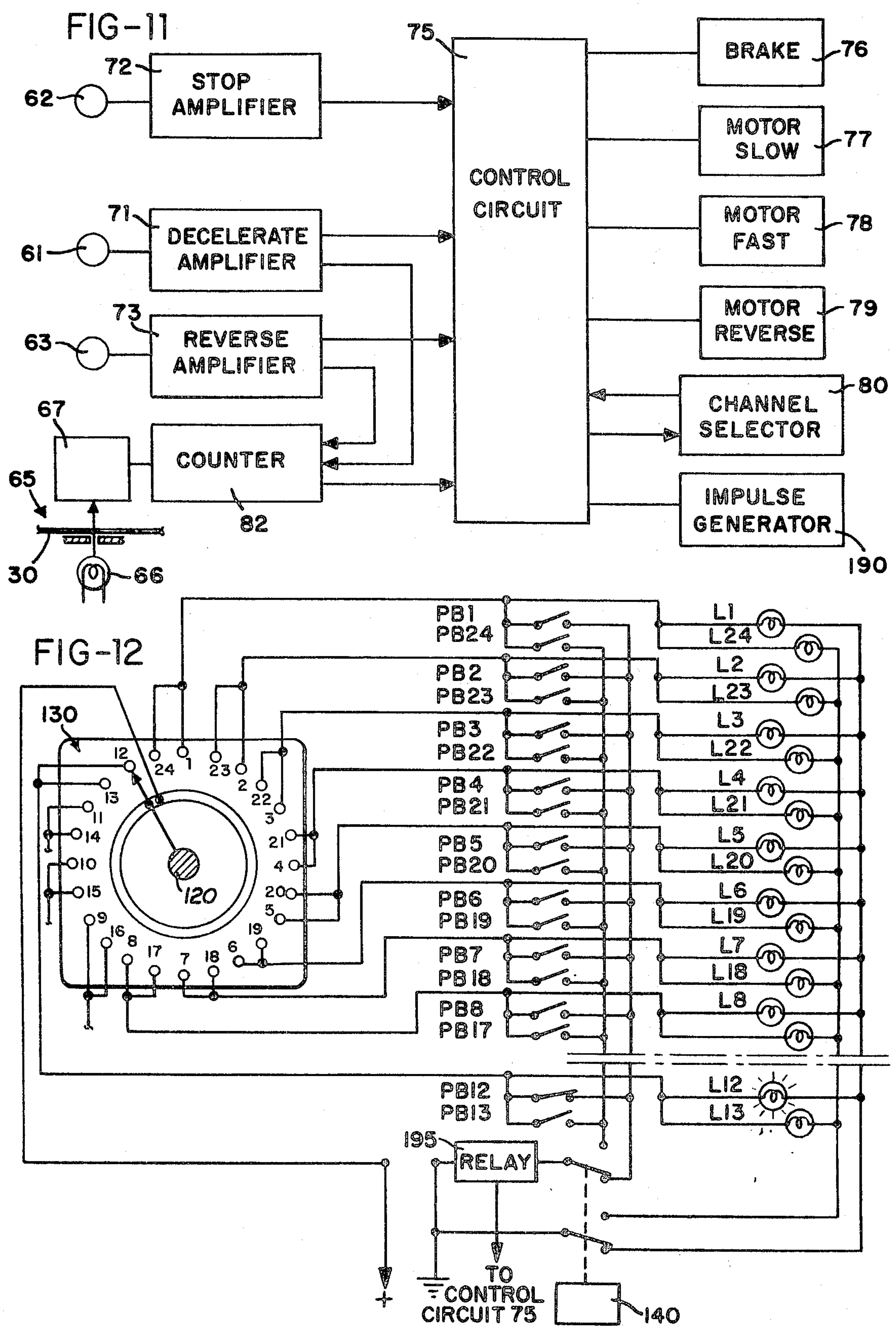
FIG. 11 is an electrical block diagram showing generally the control circuit for controlling the movement of the machine element.
FIG. 12 is an electrical schematic diagram of the selector mechanism for determining the track on the magnetic tape which will be scanned by the heads.

A block diagram of the control circuit is shown in FIG. 11. The deceleration head 61 is electrically connected to a deceleration amplifier 71, the stop head 62 is electrically connected to stop amplifier 72, and the reverse head 63 is electrically connected to reverse amplifier 73. An output from each amplifier is applied to the control circuit 75 which controls a brake solenoid 76, a motor slow device 77, a motor fast device 78 and a motor reverse device 79. The motor fast device 78 is normally energized to cause the back gauge 15 to move at the higher speed until a control mark is sensed by the deceleration head 61 at which time the control circuit 75 will cause the motor fast device 78 to be deenergized and the motor slow device 77 to energize, thus moving the back gauge at the slower speed until the stop head 62 senses the same control mark. When this occurs, the brake solenoid 76 will be energized to stop the movement of the back gauge. Upon sensing a reverse mark by the reverse head 63, the motor reverse device will cause the drive means 20 to reverse direction, and an output will be applied to the channel selector circuit 80 to move the magnetic head assembly 60 to another channel or track on the magnetic tape.

The tape position sensing means 65 has an output connected to a counter circuit 82 which also supplies a control signal to the control circuit 75. The counter 82 also receives inputs from the deceleration amplifier 71 and the reverse amplifier 73. The counter circuit 82 ensures that the back gauge moves at the lower speed when restarting in the event that control marks are located between the deceleration head 61 and the stop head 62.

The magnetic recording and/or playback heads 61, 62, and 63 are mounted for movement in a direction perpendicular to the movement of the magnetic tape 30 on a slide 90 on which is mounted a block 91. Each head is secured to shafts 92, 93, and 94 which extend through the block 91 and which are secured in place by setscrews 95. Thus, the heads 61, 62, and 63 may be aligned relative to tracks on the tape 30 and then moved in unison relative to the tape.

Figure 5:
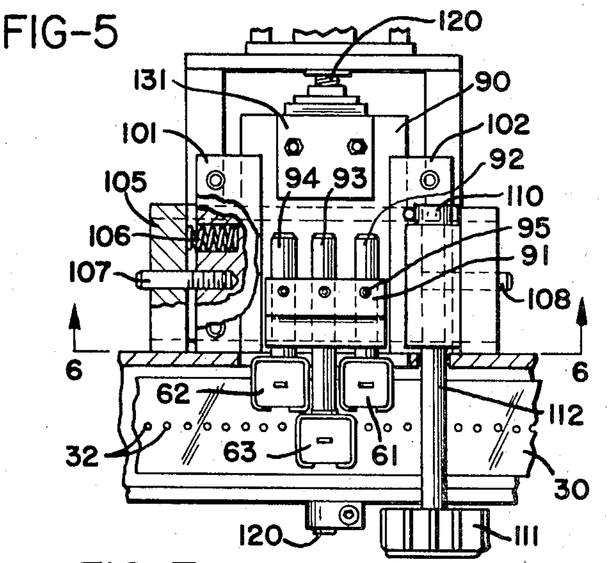
FIG. 5 is an enlarged view, with a portion thereof in cross section, of the sensing and/or recording heads and supporting mechanism.

The slide 90 is mounted for movement relative to a supporting plate 100 by guides 101 and 102. The plate 100 is mounted on to a frame 105 and is biased to the right, as shown in FIG. 5, by a spring 106. Guide pins 107 and 108 extend from the supporting plate 100 through the frame 105 to maintain alignment of the plate.

The supporting plate 100, and thus the recording and/or playback heads, can be moved in the direction of relative movement between the heads and the magnetic tape 30 by a cam 110 which is attached to a knob 111 by shaft 112. Cam 110 coacts with a pin 115 extending vertically upwardly from the supporting plate 100, and as the knob 111 is rotated, the cam 110 determines the position of the pin 115 which is held against the cam by action of the spring 106. Thus, the adjustment knob 111 may be manipulated by the machine operator to position the recording and/or playback heads relative to the marks on the control record and thus accurately position the back gauge with reference to these control marks. In the preferred embodiment, the magnetic heads can be moved through a distance of ±0.063 inch in the direction of relative movement between the tape 30 and the heads by means of the cam 115.

Figure 6:
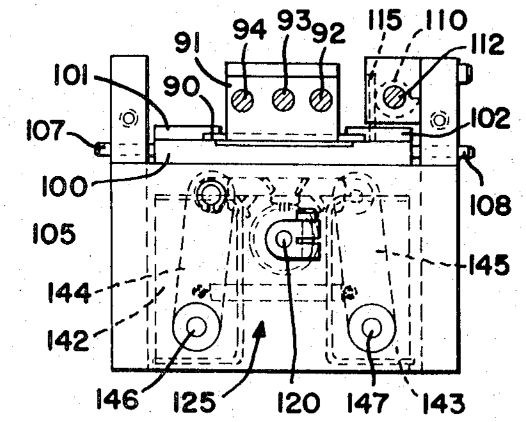
FIG. 6 is an elevational view taken along the line 6—6 in FIG. 5.
Figures 7, 8, 9, 10:
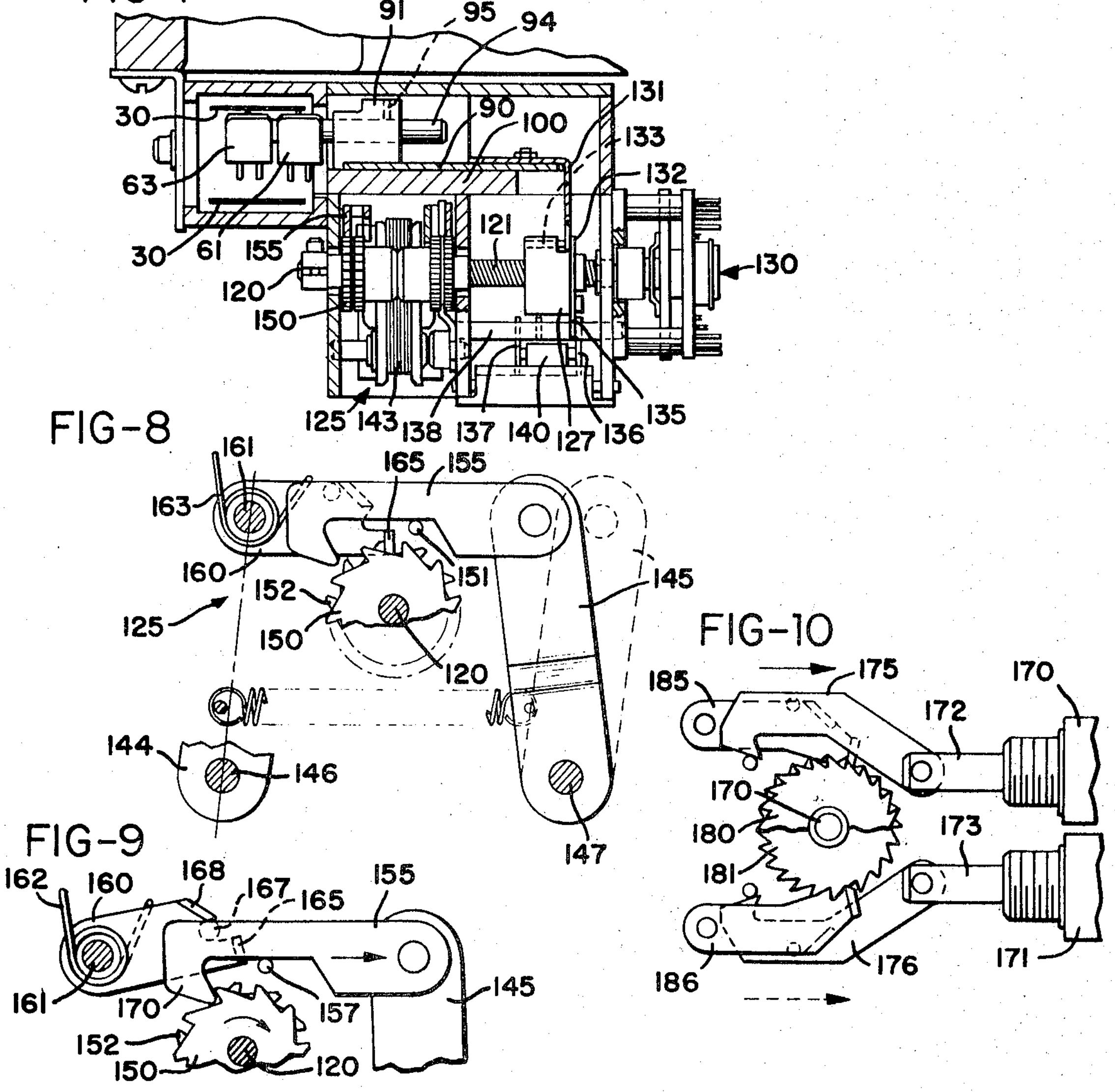
FIG. 7 is a cross-sectional view showing the mechanism for indexing the sensing and/or recording heads in a direction perpendicular to the direction of tape movement.
FIG. 8 is a view showing in detail a portion of the head-indexing mechanism.
FIG. 9 is similar to FIG. 8 and illustrates the operation of the indexing mechanism.
FIG. 10 is a view showing another embodiment of the head-indexing mechanism.

Bidirectional means for indexing the heads 61, 62, and 63 substantially perpendicular to the movement of the tape 30 is provided in the present invention and includes a shaft 120 having threads 121 formed thereon, the shaft being rotated to one of a plurality of angular positions by means of a motor, shown generally in FIGS. 6 and 7 at 125. A nonrotatable block 127 surrounds the shaft 120 and has formed therein internal threads which cooperate with the threads 121 to move the block under control of the motor 125. As shown in FIG. 7, the shaft 120 is continuous and extends through the motor 125, the block 127, and is connected to rotary electrical switch 130 so that the position of the shaft can be determined remotely.

In the embodiment of the invention shown in FIG. 7, a bracket 131 is secured to the supporting plate 100 and extends vertically downwardly into an opening 132 formed in the block 127. The size of this opening is determined by the position of setscrew 133.

A bracket 135 extends downwardly from the block 127 and is designed to engage pins 136 and 137 carried by and extending through a shaft 138 slidably mounted in the frame. The pins 136 and 137 engage an actuating arm on an electrical switch 140 so that as the block 127 moves to the right, the bracket 135 will engage the pin 136 to move the shaft 138 to the right thus causing the pin 137 to move the actuating arm of the switch 140 to the right. Similarly, after the block 127 has moved to the left a predetermined distance, the bracket 135 will then engage the pin 137 and thereafter the position of the actuating arm of the switch 140 will change. Thus, the switch 140 is used to determine the extent of travel of the block 127, and will control the limits of the total angular rotation of the shaft 120 and rotary switch 130.

The motor 125 rotates the shaft 120 through predetermined angular increments and thus moves the heads 61, 62, and 63 across the tape 30. In the preferred embodiment, therefore, the heads will also move a predetermined distance for each indexing movement of the shaft 120.

In the embodiment shown in FIG. 7, a lost motion connection is provided between the block 127 and the bracket 131 so that when the direction of rotation of the shaft 120 reverses, the heads 61, 62, and 63 will move one-half the predetermined indexing distance on the first movement and thereafter define tracks on the tape 30 when the head is moving in one direction which alternate with the tracks defined on the tape when the heads are moving in the opposite direction. The heads are moved approximately 0.060 inch for each indexing movement of the motor 125 and a 0.030-inch gap is established in the opening 132, that is between the setscrew 133 and the bracket 131 when the block 127 is moving toward the left as viewed in this FIG. or between the bracket 131 and bracket 135 when the block is moving to the right.

The motor 125 includes solenoids 142 and 143 (FIG. 6), which act on armatures 144 and 145, respectively. The armatures are pivoted about shafts 146 and 147, respectively, and when a solenoid is energized, its respective armature is moved toward the center of the solenoid.

Referring now to FIG. 8, armature 145 is shown to rotate the shaft 120 clockwise to the dashed position when its respective solenoid 143 (not shown) is energized. The shaft 120 has secured thereto two ratchet wheels 150 and 152. These ratchet wheels are mounted on the shaft adjacent each other and are oppositely oriented, that is, the teeth are sloped in opposite directions. A pawl 155 is pivotally attached to the armature 145 and is supported on a pin 157. The pawl 155 is in the same plane as the ratchet 150 and engages the radially extending portion of the teeth to rotate the shaft 120 clockwise as the armature 145 is moved toward the left upon energization of its solenoid 143.

A locking arm 160 is pivotally supported on a shaft 161 and is spring biased in the clockwise direction by a spring 163. The locking arm 160 has a locking tab 165 formed on the end thereof to engage the radial portion of one of the teeth of the ratchet 152 to prevent rotation of the shaft 120 when in the position shown in FIG. 8. As the pawl 155 moves toward the right, as shown in FIG. 9, a pin 167 carried by the pawl engages a ramp 168 on the locking arm 160 to rotate it counterclockwise about shaft 161 thus to raise the locking tab 165 out of engagement with the ratchet wheel 152 and allow the end 170 of the pawl 155 to engage the ratchet 150 and rotate the shaft 120. When the pin 167 moves far enough to the right, as viewed in FIGS. 8 and 9, the locking arm 160 will be free to rotate clockwise under the influence of spring 162 thus causing the locking tab 165 to ride down on the back side of one of the teeth of the ratchet wheel 152 until the radial surface of the next tooth contacts the tab at which time further rotation of the shaft 120 will be prevented regardless of the amount of pull exerted by the solenoid on the armature 145. Thus, the accuracy of the angular rotation of the shaft 120 will be determined by the accuracy of the radial surfaces of the ratchet 152 as they cooperate with the locking tab 165.

While not shown in detail, a similar mechanism is provided for rotating the shaft 120 in the counterclockwise direction by energizing solenoid 142 which acts on armature 144.

Thus for each impulse applied to either of the solenoids 144 or 145, depending upon the direction of rotation desired, the shaft 120 will move through a predetermined angle and cause the heads 61, 62, and 63 to index a predetermined distance across the tape 30.

Another embodiment of the invention is shown in FIG. 10 and includes solenoids 170 and 171 which selectively act upon armatures 172 and 173, respectively. The armatures are connected to pawls 175 and 176 located on opposite sides of the shaft 120. Ratchet wheels 180 and 181 are secured to the shaft 120 with ratchet wheel 180 cooperating with the pawl 175 to rotate the shaft 120 clockwise and the ratchet wheel 181 cooperating with pawl 176 to rotate the shaft 120 counterclockwise. Locking arms 185 and 186 cooperate with the ratchet wheels 181 and 180, respectively, to limit the angular rotation of the shaft and thus establish the accuracy of the indexing movement. Pins 188 and 189 mounted on pawls 175 and 176 lift the locking arms 185 and 186 out of the locking position when the pawls are moved to the right and before they engage the ratchet wheels.

In this embodiment of the invention, the lost motion provided by the opening 132 can be eliminated and alternating tracks established on the magnetic tape by doubling the number of teeth on the ratchet wheels which control the rotation of the shaft 120. In an electronic control circuit, two impulses to the solenoids would then be used to index the heads from one track to an adjacent track while the heads are moving in one direction, and when reversing direction of head travel a single impulse to the solenoid would be applied initially to move the heads through one-half the predetermined distance, and thereafter for the remainder of the tracks, two impulses would again be used for indexing. In FIG. 10, the ratchets 180 and 181 are shown as having twice as many teeth as the ratchets 150 and 152 of FIG. 8 for this purpose.

The embodiment shown in FIG. 10 therefore utilizes only two ratchet wheels 180 and 181 to rotate the shaft 120 in either direction and may be used in those environments where space is a principal consideration.

The channel selector circuit 80 is shown in FIG. 12. The switch 130, which is attached to the end of the shaft 120, provides an indication of the angular position of the shaft, and thus the channel or track which is being scanned by the heads 61, 62, and 63. In the embodiment shown, the track to be scanned is selected by one of a plurality of pushbutton switches PB1–PB24. The actual position of the heads is indicated by lamps L1–L24. For purposes of illustration, switch PB12 has been closed, indicating that it is desired that the heads be located to scan track 12 on the tape 30. Current from an impulse generator 190 is supplied through the control circuit 75 to the solenoids 142 and 143 at regular intervals until the switch 130 reaches the track corresponding to the pushbutton switch which is closed.

Current will flow through the switch 130 and the pushbutton switch PB12 to energize relay 195 only when the shaft 120 is in the correct position. At the same time, current will also flow through indicator lamp L12 to indicate that the heads are presently located in track No. 12.

As shown in the FIG., two parallel circuits are provided since the tracks alternate. The direction of rotation of the shaft is indicated by the position of the switch 140, and therefore only one set of indicator lamps is provided with power, and only one set of pushbutton switches will control the energization of the relay 195, depending on the direction of shaft rotation.

When the switch 130 completes the circuit to the relay 195, no further impulses will be applied to the solenoids, thus terminating the rotation of the shaft until a new channel is desired and selected by the operator or until a reverse mark is sensed by the reverse head 63. It should be noted that in the embodiment shown, several pushbutton switches could be closed, and the shaft 120 will stop at the first channel selected as it rotates since further operation will be terminated by energization of the relay 195.

While the forms of apparatus herein described constitute preferred embodiments of the invention, it is to be understood that the invention is not limited to these precise forms of apparatus, and that changes may be made therein without departing from the scope of the invention which is defined in the appended claims.

What is claimed is:

1. Control device for positioning a machine element to a plurality of infinitely variable locations including a magnetic tape which is moved in response to the movement of said machine element;

means for supporting a plurality of magnetic heads adjacent said magnetic tape to sense and/or record magnetic control marks on said tape;

said magnetic tape being moved relative to said magnetic heads in response to the movement of said machine element;

bidirectional means for indexing said heads substantially perpendicular to the direction of movement of said magnetic tape to define a plurality of control tracks on said tape, said indexing means moving said head a predetermined distance for each indexing movement;

means for reversing the direction of indexing of said heads; and means for moving said heads one-half said predetermined distance only when the direction of movement of said heads is initially reversed thereby to define tracks on said tape when the heads are indexed in one direction which alternate with the tracks defined when the heads are indexed in the opposite direction.

2. The control device of claim 1 wherein said means for indexing said heads includes a threaded shaft;

means for rotating said shaft through a predetermined angular distance; and means connecting said threaded shaft to said means for supporting said magnetic heads whereby said heads move through a predetermined distance for each predetermined angular rotation of said shaft.

3. The control device of claim 2 wherein said means for moving said heads one-half said predetermined distance includes a lost motion connection between said means for supporting said heads and means connecting said heads to said threaded shaft, said lost motion connection being one-half the distance through which said heads move when being indexed in one direction.

4. The control device of claim 2 wherein said means for moving said heads one-half said predetermined distance includes a control circuit for rotating said shaft through a predetermined angle twice for each indexing movement of said heads when moving said heads in a single direction and for rotating said shaft through a predetermined angle once in the opposite direction initially when the direction of movement of the heads is reversed.

5. The control device of claim 1 wherein said means for indexing said heads includes a threaded shaft;

a ratchet connected to rotate said threaded shaft;

means for moving said ratchet through a predetermined angular distance including a solenoid and a pawl which engages said ratchet;

means connecting said threaded shaft to said means for supporting said magnetic heads whereby said heads move through a predetermined distance for each predetermined angular rotation of said shaft.

6. The control device of claim 1 further including means for adjusting the supporting means in the direction of relative movement between said magnetic tape and said heads, said means including a knob accessible to the operator and a cam moved by said knob to position said supporting means.

7. A position control mechanism for a machine element which is positioned in a plurality of infinitely variable locations comprising a continuous tape upon which marks for the control of the position of said machine element may be stored;

means for moving said continuous tape synchronously with the movement of the machine element, said means including a sprocket about which said tape is reeved, chain means to rotate said sprocket and thus move said tape as said machine element is moved, and a first spring so attached to said sprocket to place said chain in tension;

roller means about which said continuous tape is reeved, and a second spring having a spring constant less than the spring constant of said first spring attached to said roller means to hold said tape in tension;

means for sensing control marks on said continuous tape to control the position of said machine element, said sensing means being movable in a direction substantially perpendicular to the direction of tape movement thereby to create a plurality of tracks upon which different sets of control marks may be formed; and means for selecting one of said tracks to control the positioning of said machine element.

* * * * *